United States Patent
Kayiran et al.

(10) Patent No.: US 11,403,221 B2
(45) Date of Patent: Aug. 2, 2022

(54) MEMORY ACCESS RESPONSE MERGING IN A MEMORY HIERARCHY

(71) Applicant: Advanced Micro Devices, Inc., Santa Clara, CA (US)

(72) Inventors: Onur Kayiran, Santa Clara, CA (US); Yasuko Eckert, Bellevue, WA (US); Mark Henry Oskin, Bellevue, WA (US); Gabriel H. Loh, Bellevue, WA (US); Steven E. Raasch, Austin, TX (US); Maxim V. Kazakov, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/031,706

(22) Filed: Sep. 24, 2020

(65) Prior Publication Data

US 2022/0091980 A1    Mar. 24, 2022

(51) Int. Cl.
*G06F 12/08*       (2016.01)
*G06F 13/16*       (2006.01)
(Continued)

(52) U.S. Cl.
CPC ...... *G06F 12/0811* (2013.01); *G06F 11/3037* (2013.01); *G06F 12/084* (2013.01);
(Continued)

(58) Field of Classification Search
CPC ............. G06F 12/0811; G06F 11/3037; G06F 12/084; G06F 13/1668; G06F 12/0877; G06F 2212/1021
See application file for complete search history.

(56) References Cited

U.S. PATENT DOCUMENTS

| 4,727,537 A | 2/1988 | Nichols |
| 5,379,297 A | 1/1995 | Glover et al. |

(Continued)

FOREIGN PATENT DOCUMENTS

| EP | 1052816 A2 | 11/2000 |
| WO | 9703549 A2 | 2/1997 |

OTHER PUBLICATIONS

International Search Report for PCT/US02/26813, dated Oct. 30, 2002, 6 pages.

*Primary Examiner* — Masud K Khan
(74) *Attorney, Agent, or Firm* — Kowert Hood Munyon Rankin and Goetzel PC; Rory D. Rankin

(57) ABSTRACT

A system and method for efficiently processing memory requests are described. A computing system includes multiple compute units, multiple caches of a memory hierarchy and a communication fabric. A compute unit generates a memory access request that misses in a higher level cache, which sends a miss request to a lower level shared cache. During servicing of the miss request, the lower level cache merges identification information of multiple memory access requests targeting a same cache line from multiple compute units into a merged memory access response. The lower level shared cache continues to insert information into the merged memory access response until the lower level shared cache is ready to issue the merged memory access response. An intermediate router in the communication fabric broadcasts the merged memory access response into multiple memory access responses to send to corresponding compute units.

20 Claims, 6 Drawing Sheets

(51) Int. Cl.
*G06F 11/30* (2006.01)
*G06F 12/0811* (2016.01)
*G06F 12/084* (2016.01)
*G06F 12/0877* (2016.01)

(52) U.S. Cl.
CPC ...... *G06F 12/0877* (2013.01); *G06F 13/1668* (2013.01); *G06F 2212/1021* (2013.01)

(56) References Cited

U.S. PATENT DOCUMENTS

| | | | |
|---|---|---|---|
| 5,440,547 A | 8/1995 | Easki et al. |
| 5,784,003 A | 7/1998 | Dahlgren |
| 5,857,078 A | 1/1999 | Date |
| 5,892,766 A | 4/1999 | Wicki et al. |
| 5,898,687 A | 4/1999 | Harriman et al. |
| 5,901,147 A | 5/1999 | Joffe |
| 5,905,998 A | 5/1999 | Ebrahim et al. |
| 5,915,104 A | 6/1999 | Miller |
| 5,918,074 A | 6/1999 | Wright et al. |
| 5,970,229 A | 10/1999 | Thomas et al. |
| 6,295,295 B1 | 9/2001 | Wicklund |
| 6,304,570 B1 | 10/2001 | Sakurai et al. |
| 6,396,809 B1 | 5/2002 | Holden et al. |
| 6,417,944 B1 | 7/2002 | Lahat et al. |
| 6,484,224 B1 | 11/2002 | Robins et al. |
| 6,542,502 B1 | 4/2003 | Herring et al. |
| 6,553,446 B1 | 4/2003 | Miller |
| 6,556,571 B1 | 4/2003 | Shahrier et al. |
| 6,611,519 B1 | 8/2003 | Howe |
| 6,629,147 B1 | 9/2003 | Grow |
| 6,654,346 B1 | 11/2003 | Mahalingaiah et al. |
| 6,661,774 B1 | 12/2003 | Lauffenburger et al. |
| 6,674,754 B1 | 1/2004 | Ofek |
| 6,687,247 B1 | 2/2004 | Wilford et al. |
| 6,735,679 B1 | 5/2004 | Herbst et al. |
| 6,745,277 B1 | 6/2004 | Lee et al. |
| 6,751,698 B1 | 6/2004 | Deneroff et al. |
| 6,754,211 B1 | 6/2004 | Brown |
| 6,754,222 B1 | 6/2004 | Joung et al. |
| 6,760,337 B1 | 7/2004 | Snyder, II et al. |
| 6,768,717 B1 | 7/2004 | Reynolds et al. |
| 6,781,994 B1 | 8/2004 | Nogami et al. |
| 6,907,001 B1 | 6/2005 | Nakayama et al. |
| 6,912,637 B1 | 6/2005 | Herbst |
| 6,940,814 B1 | 9/2005 | Hoffman |
| 6,950,394 B1 | 9/2005 | Chou et al. |
| 6,950,430 B2 | 9/2005 | Kalkunte et al. |
| 6,952,401 B1 | 10/2005 | Kadambi et al. |
| 6,959,002 B2 | 10/2005 | Wynne et al. |
| 6,975,638 B1 | 12/2005 | Chen et al. |
| 6,996,099 B1 | 2/2006 | Kadambi et al. |
| 6,999,415 B2 | 2/2006 | Luijten et al. |
| 7,002,926 B1 | 2/2006 | Eneboe et al. |
| 7,145,869 B1 | 12/2006 | Kadambi et al. |
| 7,274,692 B1 | 9/2007 | Hughes |
| 9,817,594 B2 | 11/2017 | Holbrook et al. |
| 9,836,412 B2 | 12/2017 | McConnell |
| 10,275,352 B1 * | 4/2019 | Balakrishnan ........ G06F 12/084 |
| 10,459,859 B2 | 10/2019 | Jain et al. |
| 2003/0035371 A1 | 2/2003 | Reed et al. |
| 2011/0314255 A1 | 12/2011 | Krishna et al. |
| 2020/0089550 A1 | 3/2020 | Christidis et al. |
| 2020/0117467 A1* | 4/2020 | Chirca ................. G06F 3/0679 |
| 2020/0201776 A1* | 6/2020 | Isenegger ............. G06F 12/127 |
| 2021/0064550 A1* | 3/2021 | Hendrickson ....... G06F 11/3037 |

* cited by examiner

MEMORY ACCESS RESPONSE MERGING IN A MEMORY HIERARCHY

The invention described herein was made with government support under the PathForward Project with Lawrence Livermore National Security (Prime Contract No. DE-AC52-07NA27344, Subcontract No. B620717) awarded by the United States Department of Energy. The Government has certain rights in this invention.

BACKGROUND

Description of the Relevant Art

A variety of computing devices utilize heterogeneous integration, which integrates multiple types of integrated circuits (ICs) for providing system functionality. Examples of the multiple functions are audio/video (A/V) data processing, other high data parallel applications for the medicine and business fields, processing instructions of a general-purpose instruction set architecture (ISA), digital, analog, mixed-signal and radio-frequency (RF) functions, and so forth. A variety of choices exist for placing a processing node in system packaging to integrate the multiple types of ICs. Some examples are a system-on-a-chip (SOC), multi-chip modules (MCMs) and a system-in-package (SiP).

Regardless of the choice for system packaging, in several uses, the performance of one or more computing systems depends on quick access to stored data. The memory access operations include read operations, write operations, memory-to-memory copy operations, and so forth. Several types of data-intensive applications rely on quick access to data storage to provide reliable high-performance for several local and remote programs and their users. The memory hierarchy transitions from relatively fast, volatile memory, such as registers on a processor die and caches either located on the processor die or connected to the processor die, to non-volatile and relatively slow memory. The interfaces and access mechanisms for the different types of memory also changes. The available data bandwidth for lower levels of the memory hierarchy is relatively high. However, the achieved bandwidth becomes limited due to the lower response bandwidth. Therefore, when techniques are used to saturate the available bandwidth for accessing the lower levels of the memory hierarchy, the overall bandwidth is still limited since these techniques do not handle any inefficiencies in the response bandwidth.

In view of the above, efficient methods and mechanisms for efficiently processing memory requests are desired.

Figure 1:
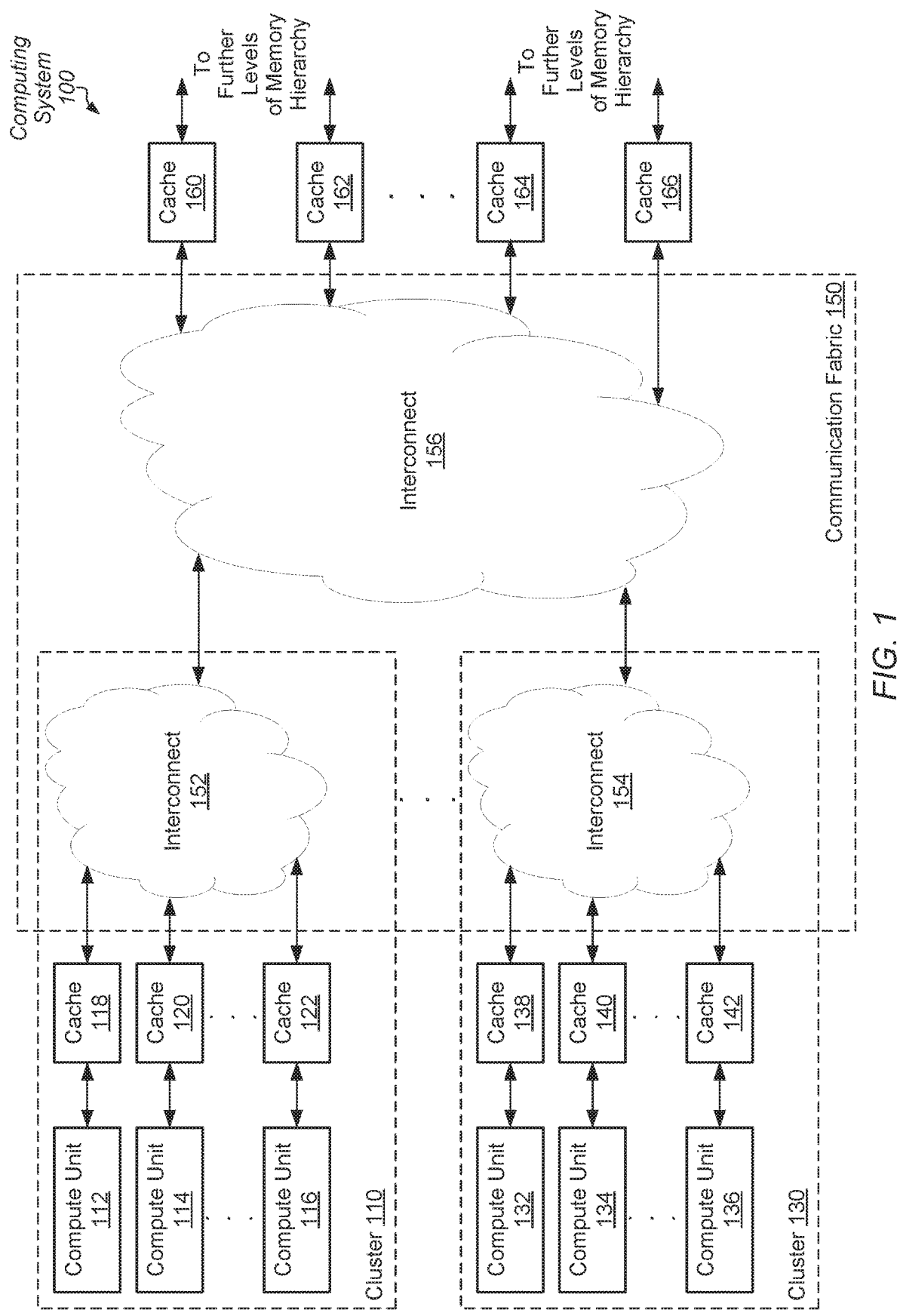
FIG. 1 is a generalized diagram of one embodiment of a computing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Systems and methods for efficiently processing memory requests are contemplated. A computing system includes multiple compute units for processing software applications, multiple caches of a memory hierarchy and a communication fabric. A first cache is located relatively near a compute unit and a second cache is located across the communication fabric from the compute unit. The compute unit generates a memory access request that misses in the first cache. The first cache sends a miss request to the second shared cache. The second cache services the miss request. During servicing, the secondcache merges identification information of multiple memory access requests from multiple compute units into a merged memory access response. These multiple compute units generated memory access requests targeting a same cache line as the original memory access request.

The second cache continues to insert information into the merged memory access response until the second cache is ready to issue the merged memory access response. In one case, the second cache is ready to issue the merged memory access response when the requested data has been retrieved from system memory or another cache located relative close to system memory after the original memory access request missed in the second cache. In another case, the second cache is ready to issue the merged memory access response when the original memory access request hit in the second cache, and the second cache has waited a threshold period of time after the hit.

An intermediate router or switch in the communication fabric receives the merged memory access response. This router generates multiple memory access responses from the merged memory access response, and sends one of the multiple memory access responses to the first cache. Transmitting the merged response through one or more levels of routing logic and intermediate queues of the communication fabric before broadcasting (or multicasting) multiple memory access responses from the merged response reduces the bandwidth utilization of the communication fabric.

Turning now to FIG. 1, a generalized block diagram of one embodiment of a computing system 100 is shown. As shown, the computing system 100 includes multiple clusters 110 and 130, a memory hierarchy with multiple caches, and a communication fabric 150. In some embodiments, the functionality of the computing system 100 is included as components on a single die, such as a single integrated circuit. In other embodiments, the functionality of the computing system 100 is included as multiple dies on a system-on-a-chip (SOC). In other embodiments, the components are individual dies in a system-in-package (SiP) or a multi-chip module (MCM). In yet other embodiments, the multiple components are individual dies or chips on a printed circuit board.

In various embodiments, the computing system 100 is used in a desktop, a portable computer, a mobile device, a server, a peripheral device, or other. Clock sources, such as phase lock loops (PLLs), interrupt controllers, power controllers, memory controllers, interfaces for input/output (I/O) devices, and so forth are not shown in FIG. 9 for ease of illustration. It is also noted that the number of components of the computing system 100 and the number of subcomponents for those shown in FIG. 1, such as within the clusters 110 and 130, may vary from embodiment to embodiment. There may be more or fewer of each component/subcomponent than the number shown for the computing system 100.

Each of the clusters 110 and 130 includes multiple compute units and caches. For example, cluster 110 includes compute units 112-116 and caches 118-122, and cluster 130 includes compute units 132-136 and caches 138-142. In some embodiments, each of the compute units 112-116 and 132-136 uses multiple streaming processors, such as shaders, and the computing system 100 is a parallel data processing engine such as a graphics processing engine. The streaming processors use a single-instruction-multiple-data ("SIMD") microarchitecture that includes multiple parallel execution lanes. In such an embodiment, the computing system 100 is a single graphics processing unit (GPU) on a graphics processing card inserted in a motherboard. In one example, the computing system 100 includes 40 compute units, each with 64 streaming processors providing a total of 2,560 streaming processors for executing graphics applications.

In other embodiments, each of the compute units 112-116 and 132-136 uses one or more clients for processing a variety of software applications. Examples of clients are a general-purpose central processing unit (CPU), a parallel data processing engine, a multimedia engine, an application specific integrated circuit (ASIC), a digital signal processor (DSP), a field programmable gate array (FPGA), and so forth. Generally speaking, the CPU includes one or more processor cores for executing instructions according to a given instruction set architecture (ISA). One or more of the processor cores uses a superscalar and multi-threaded microarchitecture for processing instructions. The multimedia engine includes processors for processing audio data and video data for multimedia applications.

The address space of the computing system 100 is divided among multiple memories. In some designs, system memory is implemented with one of a variety of dynamic random access memories (DRAMs), which includes multiple memory devices, each for servicing memory accesses within a particular address range. The system memory is filled with instructions and data from main memory implemented with one of a variety of non-volatile storage devices such as a hard disk drive (HDD) or a solid-state drive (SSD). In various embodiments, the address space includes a virtual address space, which is partitioned into a particular page size with virtual pages mapped to physical memory frames. These virtual-to-physical address mappings are stored in a page table in the system memory. In some designs, access permissions are stored with corresponding virtual-to-physical address mappings.

The compute units 112-116 and 132-136 obtain, after a page table walk, a copy of a portion of the physical addresses stored in the page table. The compute units 112-116 and 132-136 store the copy with associated virtual addresses as mappings along with any access permissions in one or more translation lookaside buffers (TLBs). These one or more TLBs are associated with one or more levels of a memory hierarchy. The memory hierarchy transitions from relatively fast, volatile memory, such as registers on a processor die and caches either located on the processor die or connected to the processor die, to non-volatile and relatively slow memory. In some implementations, the faster, volatile memory is considered to be at the top or at the highest level of the memory hierarchy, whereas, the slower, non-volatile memory is considered to be at the bottom or the lowest level of the memory hierarchy. In these implementations, a first level of the memory hierarchy located closer to the faster, volatile memory of the hierarchy than a second level of the memory hierarchy is considered to be at a "higher" level than the second level. In other implementations, the slower, non-volatile memory is considered to be at the top or at the highest level of the memory hierarchy. Although both ways of describing the memory hierarchy are possible and contemplated, in the following description, the faster, volatile memory is considered to be at the top or at the highest level of the memory hierarchy. Therefore, the higher levels of the memory hierarchy include the faster, volatile memory, such as processor registers and level-one (L1) local caches, while the lower levels of the memory hierarchy include the non-volatile, slower memory such as a hard disk drive (HDD) or a solid-state drive (SSD).

In one embodiment, the caches 118-122 of cluster 110 represent level-one (L1) cache structures and caches 160-166 represent level-two (L2) shared cache structures. The cache structures include a TLB for storing address mappings and access permissions, a tag array for storing addresses, and a data array for storing initial, intermediate and result data for applications. In another embodiment, the compute units 112-116 include L1 cache structures, the caches 118-122 of cluster 110 represent L2 cache structures and caches 160-166 represent L3 shared cache structures. In various embodiments, cluster 130 uses a same memory hierarchy as cluster 110. The system memory and/or main memory sends a cache fill line with a requested cache line (or cache block) to a corresponding one of the caches 118-122 and 138-142 in order to complete an original memory request. A copy of the requested cache line is also stored in one of the caches 160-166.

Communication fabric 150 (or the fabric 150) transfers data back and forth between the clusters 110-130 and the memory controller 130 and includes interfaces for supporting respective communication protocols. The protocols determine values used for information transfer, such as a number of data transfers per clock cycle, signal voltage levels, signal timings, signal and clock phases and clock frequencies. Examples of the data transferred across the communication fabric 150 are commands, messages, probes, interrupts, response commands, response data, and payload data corresponding to the commands and messages. The fabric 150 includes queues for storing requests and responses. The fabric 150 also includes selection logic, such as circuitry, for arbitrating between received requests or received responses before sending requests (or responses) across an internal network between intermediate queues. Additional logic in the fabric 150 builds and decodes packets as well as selects routes for the packets. Fabric 150 uses one or more of point-to-point connections, buses and multi-port routers to transfer information.

As shown, fabric 150 is partitioned into interconnect 152 for servicing memory access requests from cluster 110 and interconnect 154 for servicing memory access requests from cluster 130. Interconnect 156 communicates with the caches 160-166 in addition to the interconnect 152 and interconnect 154. In one example, compute unit 112 of cluster 110 generates a memory access request and if the targeted cache line is not found in cache 118, then the cache controller of the cache 118 generates a miss request. Based on the target address, cache 118 sends the miss request to one of the caches 160-166 via the interconnect 152 and interconnect 156.

If the interconnect 156 selects cache 160 to service the miss request based on the target address, then the cache controller of the cache 160 searches at least the tag array of the cache 160. If the cache controller of cache 160 finds the targeted cache line in the cache 160, then the cache controller generates a memory access response. If the miss request corresponds to a read request, then the memory access response is a read response that includes a read response command and read response data. If the miss request corresponds to a write request, then the memory access response is a write response that includes an indication of a write completion when write responses are used by the computing system 100. In various embodiments, computing system 100 has a larger number of caches 118-122 and 138-142 than a number of caches 160-166. For example, in one implementation, the caches 118-122 and 138-142 include 64 L1 caches and the caches 160-166 include 16 L2 caches. Therefore, the peak bandwidth of the caches 160-166 is a fraction of the peak bandwidth of the caches 118-122 and 138-142. For workloads that have a relatively high demand on the caches 160-166 for servicing memory requests, it is possible that interconnect 156 limits performance for computing system 100. Therefore, in various embodiments, the cache controllers of caches 160-166 merge memory access responses in order to reduce an amount of data transferred through interconnect 156. The cache controllers of caches 118-122 and 138-142 and circuitry of the communication fabric 150 do not merge memory access requests. Rather, computing system 100 relies on the caches 160-166 to merge memory access responses as further described in the below description.

The cache 160 needs to send the memory access response to the compute unit 112, which originally sent the corresponding memory access request. However, rather than consider the memory access response with other memory access responses as candidates for arbitration for issue, the cache controller of cache 160 marks the memory access response as not being a candidate for issue. The cache controller of cache 160 also measures a duration of time. For a period of time equal to a threshold, the cache 160 removes the memory access response from arbitration for issue, and merges memory access responses corresponding to memory access requests that target the same cache line sent from compute units 112-116 and 132-136. The memory access requests are of a same type as the original memory access request generated by compute unit 112. For example, if the original memory access request was a read request, then during the threshold period of time, other read requests have read responses merged with the read response for compute unit 112. If the original memory access request was a write request, then during the threshold period of time, other write requests have write responses, such as acknowledgments, merged with the write response for compute unit 112. In some embodiments, caches 160-166 support merging memory access responses for read responses, but not write responses. For example, write responses do not include a relatively large amount of data such as read response data. Therefore, write responses do not limit the peak bandwidth of communication fabric 150 such as the peak bandwidth of interconnect 156. In other embodiments, caches 160-166 support merging memory access responses for both read responses and write responses.

The memory access requests that have responses merge with the merged memory access response include memory access requests already stored in a queue of the cache controller of cache 160 when the memory access response was generated. Additionally, memory access requests that have responses merge with the merged memory access response include memory access requests received by cache 160 after the original cache hit and the generation of the original memory access response. When the measured period of time exceeds the threshold, the cache 160 sends the merged memory access response to one or more of the compute units 112-116 and 132-136 via the fabric 150.

In some embodiments, the cache 160 sends a single merged memory access response. This single merged memory access response includes information identifying any one of the compute units 112-116 and 132-136 to receive a memory access response. In other embodiments, the cache 160 sends a merged memory access response for any cluster with a compute unit that sent a memory access request with a response merged in the merged memory access response. In one example, compute unit 112 generates the original memory access request, and cache 118 sends this memory access request to cache 160 via the communication fabric 150. Later, compute units 132-136 generate memory access requests targeting the same data, such as a cache line, and caches 138-142 send the memory access requests to cache 160 via the communication fabric 150. After cache 160 determines the threshold period of time has elapsed, cache 160 sends a first memory access response to interconnect 152 and a second memory access response to interconnect 154.

The first memory access response from cache 160 identifies compute unit 112 and traverses interconnect 156 and interconnect 152. The second memory access response identifies compute units 132-136 and traverses interconnect 156 and interconnect 154. The logic of interconnect 154 generates at least three memory access responses from the received second memory access response. The at least three memory access responses are sent to corresponding compute units of compute units 132-136. Therefore, the cache 160 does not send four individual memory access responses to interconnect 156. Rather, the cache 160 sends one or two memory access responses to interconnect 156. The logic of interconnect 156 generates multiple memory access responses from a received merged memory access response based on the information identifying the sources that generated the corresponding memory access requests.

Interconnect 152 also includes the above logic used by interconnect 154. This logic is implemented by hardware such as circuitry. In other embodiments, the interconnect 156 includes similar logic, and receives a single merged memory access response from cache 160, and then, from this single merged memory access response, generates two memory access responses to send to the interconnect 152 and the interconnect 154. Transmitting the merged response through one or more levels of routing logic and intermediate queues of the communication fabric 150 before broadcasting (or multicasting) multiple memory access responses from the merged response reduces the bandwidth utilization of the communication fabric 150.

Figure 2:
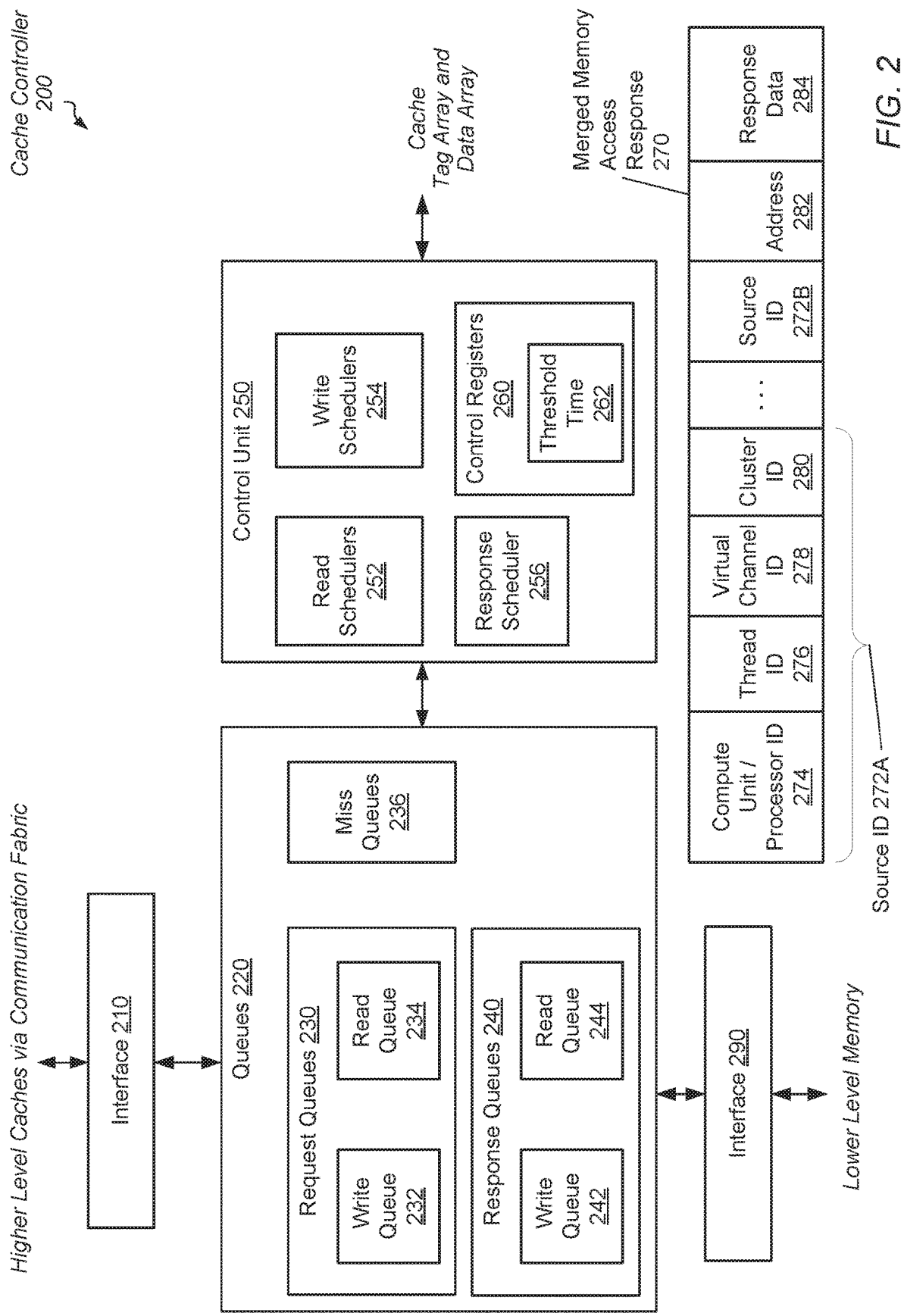
FIG. 2 is a generalized diagram of one embodiment of a cache controller.

Referring to FIG. 2, a generalized block diagram of one embodiment of a cache controller 200 is shown. In some embodiments, the cache controller 200 is a cache controller of a cache located across a communication fabric from multiple compute units that generate memory access requests. In one embodiment, the cache controller 200 is used with a cache at a level of a memory hierarchy lower than a level-one (L1) cache that is located relatively near a compute unit. For example, the cache controller 200 is used with a shared L2 cache, a shared L3 cache or other lower level cache located across a communication fabric from the multiple compute units. In the illustrated embodiment, cache controller 200 includes an interface 210 to higher level caches via a communication fabric, queues 220 for storing received memory access requests and received memory access responses, control unit 250 and an interface 280 to lower level memory. Examples of the lower level memory are lower level caches, system memory and main memory.

Each of interfaces 210, and 280 supports a corresponding communication protocol. In an embodiment, interface 280 is an interface to a memory command bus for sending memory access commands corresponding to memory requests received via interface 210 to a memory device. In the illustrated embodiment, queues 220 includes request queues 230, response queues 240, and miss queues 236. In an embodiment, request queues 230 includes a write queue 232 for storing received write requests and a read queue 234 for storing received read requests. The write requests and the read requests corresponding to miss requests generated by higher level caches. The miss queues 236 store memory requests that miss in one or more of a TLB and a data array of a cache at a same level as the cache controller 200 of a memory hierarchy.

In some embodiments, the control unit 250 uses read schedulers 252, which include arbitration logic for selecting read requests from the read queue 234 out-of-order. In an embodiment, read schedulers 252 select a read request from the read queue 234 when a respective request is available for scheduling in a given clock cycle from the read queue 234. In some embodiments, read schedulers 252 schedule read requests for out-of-order issue based on weighted criteria and the criteria includes one or more of quality-of-service (QoS) or other priority information, age, a process or thread identifier (ID), an application identifier or type, such as a real-time application, an indication of data type, such as real-time data, and a relationship with other stored requests.

Responses are returned to the cache controller 200 after a deterministic latency with an indication specifying whether valid data is included in the responses. When a hit had occurred in each of the TLB and the data array of the cache, the returned response includes valid data. The response is stored in the read queue 244 of the response queues 240. When a miss had occurred in one of the TLB and the data array, an indication of the miss is returned to the cache controller 200, and a miss request is generated and stored in the miss queues 236. When selected by a scheduler (not shown), the interface 290 sends the miss request to lower level memory for servicing. At a later time, the interface 290 receives a response with valid data and stores the response in the read queue 244 of the response queues 240.

Write schedulers 254 include similar selection logic for the write queue 232 as used by the read schedulers 252. In an embodiment, response scheduler 256 includes similar logic for issuing responses out-of-order to higher level caches based on priorities. Response scheduler 256 includes similar selection logic as used by the read schedulers 252 and the write schedulers 254. In some embodiments, the received response data includes a tag or other identifier that the response scheduler 256 uses to identify which command stored in the read queue 234 is associated with the response data.

When the memory access request is a read request, control logic (not shown) of the control unit 250 stores a merged memory access response 270 with the requested data in the read response queue 244 and marks the merged memory access response 270 as not being a candidate for issue. Therefore, the response scheduler 256 does not consider the marked, merged memory access response for scheduling for issue to higher level caches via the interface 210. In addition, the control logic measures a duration of time since the merged memory access response was marked. The control logic compares the duration of time to a threshold period of time. In some embodiments, control registers 260 include multiple programmable configuration registers. In various embodiments, control registers 260 store a threshold period of time (or threshold time) 262, which is compared with the measured duration of time.

When the control logic determines the measured duration of time does not exceed the threshold period of time 262, then the control logic inserts information, in the merged memory access response, identifying sources of one or more memory access requests targeting a same cache line as the original memory access request. The original memory access request was the memory access request that caused the control logic to create the merged memory access response. Merging responses refers to inserting information in source identifiers (IDs) 272A-272B in the merged memory access response 270. Examples of the inserted information includes the source IDs 272A-272B. The source ID 272A includes information stored in fields 274-280. Source ID 272B includes similar information. Field 274 includes an identifier (ID) of one or more of a compute unit and a processor of the compute unit that generated a corresponding memory access request. Field 276 stores the thread ID. In other embodiments, one of the fields 272-274 additionally includes other information such as a process ID and an application ID.

As shown, field 278 stores a virtual channel ID. Request streams from multiple different physical devices flow through virtualized channels (VCs) over a same physical link. In some embodiments, arbitration logic uses at least priority levels of virtual channels and the stored virtual channel IDs when selecting requests for issue. Field 280 stores a cluster ID. As shown earlier, communication fabric 150 (of FIG. 1) includes multiple interconnects 152-154 for clusters 110-130. Field 282 stores at least a portion of a target address. Field 284 stores response data, which is the data requested by the corresponding read request.

The memory access requests that have responses merge with the merged memory access response 270 include memory access requests already stored in read queue 234 when the memory access response was generated. Merging responses refers to inserting information in source IDs 272A-272B in the merged memory access response 270. Additionally, memory access requests that have responses merge with the merged memory access response 270 include memory access requests stored in the read queue 234 after the original cache hit and the generation of the original memory access response 270. These memory access requests that have responses merge with the merged memory access response 270 target a same cache line. For example, these memory access requests have a same address as the address information stored in field 282.

In some embodiments, the control unit 250 updates the threshold time 262 based on criteria such as high latency tolerance so that long delays at the cache controller 200 does not reduce performance. Other criteria include sufficient spatial locality so that memory access responses can be merged. Yet other criteria include high bandwidth demand at the cache controller 200 so that response merging provides performance improvement. In some embodiments, the control unit 250 receives information from external control logic indicating how to update the threshold time 262. For example, the external logic inserts information in the memory access requests indicating how to update the threshold time 262. In an embodiment, the information is a bit vector that is decoded by the control unit 250. This external logic considers workloads that have a high memory to compute instruction ratio, workloads with software applications stalling frequently due to not obtaining requested data from higher level caches, workloads that have limited parallelism, and workloads that are limited by the memory bandwidth. In some embodiments, this external logic also monitors a number of outstanding memory requests compared to a maximum number of supported outstanding memory requests.

In some embodiments, the control unit 250 monitors how many memory responses were eliminated by merging memory responses and how many memory requests were received within a particular time interval. The control unit 250 combines this information with the information received from the external logic monitoring the workload of the computing system. The control unit 250 uses the combination of the information to update the threshold time 262. It is noted that updating the threshold time 262 to zero is equivalent to not using merging when a memory access request hits in the cache. However, during the servicing of a cache miss, merging is still used since no additional latency is added to handling the corresponding memory access request. The control unit 250 attempts to assess the performance of applications running on the computing system and estimating the performance sensitivity to the increased latency of handling memory access requests that hit in the cache of the level of memory hierarchy of the cache controller 200.

When the control logic of the cache controller 200 determines the measured duration exceeds the threshold time 262, the control logic marks the merged memory access response 270 as a candidate for issue. The control logic has completed merging responses of multiple memory access requests into the merged memory access response 270. In some embodiments, the cache controller 200 sends a single merged memory access response 270 to the communication fabric via the interface 210. This single merged memory access response 270 includes information identifying any one of the compute units to receive a memory access response.

In other embodiments, the cache controller 200 sends a merged memory access response for any cluster with a compute unit that sent a memory access request with a response merged in the merged memory access response. Therefore, when each of two separate clusters have sent one or more memory access requests that had information merged in the merged memory access response 270, the cache controller 200 sends two memory access responses, one for each of the two clusters. Later, after the merged memory access response(s) are scheduled for issue, and issued, control logic within the communication fabric generates multiple memory access responses from a single merged memory access response to send to corresponding compute units. Transmitting the merged response through one or more levels of routing logic and intermediate queues of the communication fabric before broadcasting (or multicasting) multiple memory access responses from the merged response reduces the bandwidth utilization of the communication fabric.

Figure 3:
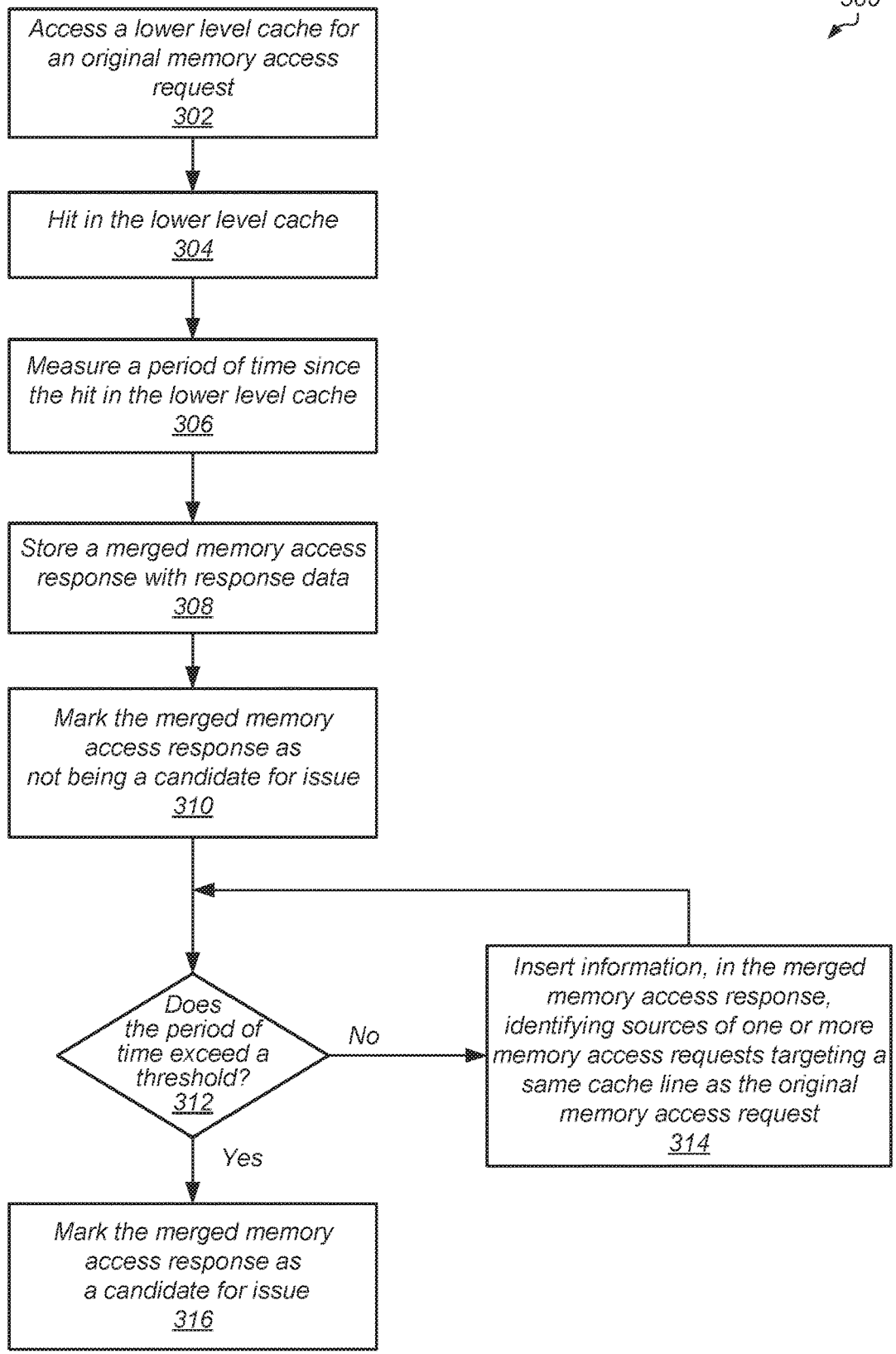
FIG. 3 is a generalized diagram of another embodiment of a method for efficiently processing memory requests.

Referring now to FIG. 3, one embodiment of a method 300 for efficiently processing memory requests is shown. For purposes of discussion, the steps in this embodiment (as well as in FIGS. 4 and 6) are shown in sequential order. However, in other embodiments some steps occur in a different order than shown, some steps are performed concurrently, some steps are combined with other steps, and some steps are absent.

A cache controller receives, via a communication fabric, memory access requests generated by multiple compute units. The cache controller communicates with a lower level cache. Regarding the memory hierarchy, the cache controller is at a same level as the lower level cache. In one example, the lower level cache is a level two (L2) shared cache. However, other levels of the memory hierarchy are possible and contemplated. The cache stores data for servicing memory access requests from the multiple compute units. For example, the cache uses a tag array and a data array with entries arranged in a direct-mapped manner, a fully-associative manner, or a set-associative manner. Other storage arrangements are also possible and contemplated.

The control logic of the cache controller includes hardware, such as circuitry. The control logic of the cache controller schedules memory access requests to issue to the cache based on weighted criteria. Examples of the criteria are a quality-of-service (QoS) or other priority levels of the memory access requests, process or software thread identifiers (IDs) of the memory access requests, ages of the memory access requests, and so forth. The cache controller issues a memory access request, which accesses the lower level cache (block 302). It is noted that the control logic already determined that the issued memory access request did not target an address of a previous outstanding merged memory access request. Otherwise, this memory access request would have been removed from consideration for issue to the cache and had corresponding information inserted in an outstanding merged memory access response. These steps are further described in the below description.

The issued memory access request accesses the TLB to obtain a corresponding physical address. The access result is a hit in the TLB and is a hit in the cache (block 304). Therefore, the control logic accesses the data array of the cache using the physical address obtained from the tag array of the cache. The control logic measures a period of time since the merged memory access hit in the cache (block 306). When the memory access request is a read request, the control logic reads the requested data from the data array and stores a merged memory access response with the requested data, which is the response data (block 308). For example, the control logic stores the merged memory access response with the response data in a response queue. In some embodiments, the response queue includes a command queue for storing read response commands and a response data queue for storing response data corresponding to read response commands. In other embodiments, the read response command and the read response data are stored together in a single response.

The control logic of the cache controller marks the merged memory access response as not being a candidate for issue (block 310). In other embodiments, the control logic both stores and marks the merged memory access response when the memory access request issues to the cache and before the hit status is known. By doing so, the control logic prevents other memory access requests targeting the same cache line from being selected for issue to the cache. Rather, these other memory access requests will have identifying information inserted in the merged memory access response as further described below. The control logic compares the measured time to a threshold period of time. In one embodiment, the control logic counts up from zero to a value indicating the threshold period of time. In another embodiment, the control logic counts down from the value indicating the threshold period of time to zero. In various embodiments, the value indicating the threshold period of time is stored in a programmable configuration register.

If the control logic of the cache controller determines the measured time does not exceed the threshold period of time ("no" branch of the conditional block 312), then the control logic inserts information, in the merged memory access response, identifying sources of one or more memory access requests targeting a same cache line as the original memory access request (block 314). The original memory access request was the memory access request that caused the control logic to create the merged memory access response. Examples of the inserted information includes the information of fields 274-280 (of FIG. 2). The memory access requests that have responses merge with the merged memory access response include memory access requests already stored in a queue of the cache controller when the memory access response was generated. Additionally, memory access requests that have responses merge with the merged memory access response include memory access requests received by the cache controller after the original cache hit and the generation of the original memory access response.

If the control logic of the cache controller determines the measured time exceeds the threshold period of time ("yes" branch of the conditional block 312), then the control logic marks the merged memory access response as a candidate for issue (block 316). The control logic has completed merging responses of multiple memory access requests into the merged memory access response. In some embodiments, the cache controller sends a single merged memory access response to the communication fabric. This single merged memory access response includes information identifying any one of the compute units to receive a memory access response. In other embodiments, the cache controller sends a merged memory access response for any cluster with a compute unit that sent a memory access request with a response merged in the merged memory access response. Later, after the merged memory access response(s) are scheduled for issue, and issued, control logic within the communication fabric generates multiple memory access responses from a single merged memory access response to send to corresponding compute units. Transmitting the merged response through one or more levels of routing logic and intermediate queues of the communication fabric before broadcasting (or multicasting) multiple memory access responses from the merged response reduces the bandwidth utilization of the communication fabric.

Figure 4:
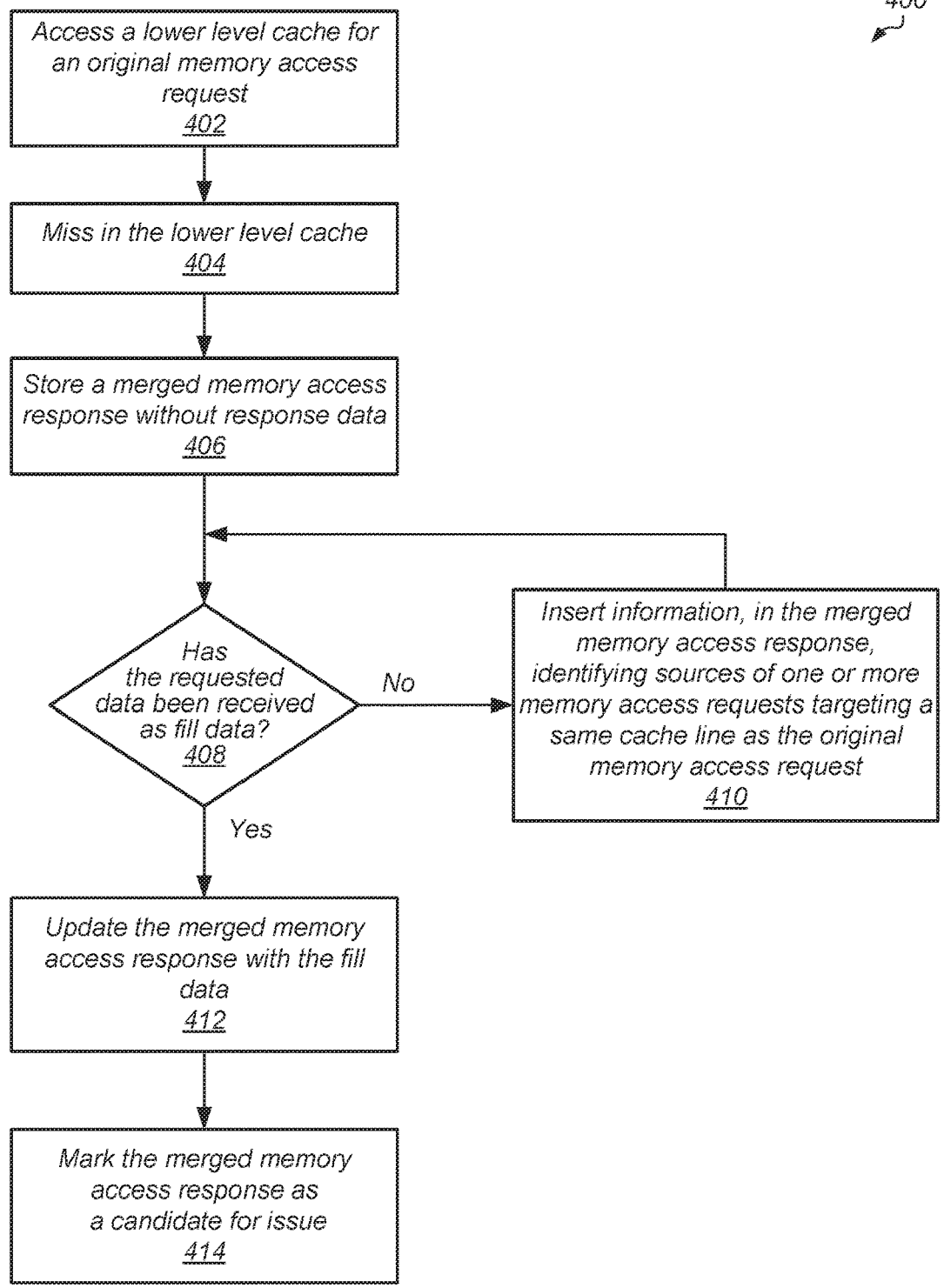
FIG. 4 is a generalized diagram of another embodiment of a method for efficiently processing memory requests.

Turning now to FIG. 4, one embodiment of a method 400 for efficiently processing memory requests is shown. A cache controller receives, via a communication fabric, memory access requests generated by multiple compute units. The cache controller communicates with a lower level cache of a memory hierarchy. Regarding the memory hierarchy, the cache controller is at a same level as the lower level cache. In one example, the lower level cache is a level two (L2) shared cache. However, other levels of the memory hierarchy are possible and contemplated. The cache controller issues a memory access request, which accesses the lower level cache (block 402).

The issued memory access request accesses the TLB to obtain a corresponding physical address. The access result is a hit in the TLB, but is a miss in the cache (block 404). Therefore, the control logic stores a miss request in a miss queue and stores a merged memory access response without the requested data, which is the response data (block 406). In other embodiments, the control logic both stores and marks the merged memory access response as not being a candidate for issue when the memory access request issues to the cache and before the miss status is known. By doing so, the control logic prevents other memory access requests targeting the same cache line from being selected for issue to the cache. Rather, these other memory access requests will have identifying information inserted in the merged memory access response as further described below.

If the control logic of the cache controller determines the requested data has not been received as fill data based on the corresponding miss ("no" branch of the conditional block 408), then the control logic inserts information, in the merged memory access response, identifying sources of one or more memory access requests targeting a same cache line as the original memory access request (block 410). The original memory access request was the memory access request that caused the control logic to create the merged memory access response and the miss request. Examples of the inserted information includes the information of fields 274-280 (of FIG. 2).

The memory access requests that have responses merge with the merged memory access response include memory access requests already stored in a queue of the cache controller when the memory access response was generated. Additionally, memory access requests that have responses merge with the merged memory access response include memory access requests received by the cache controller after the original cache miss and the generation of the original memory access response. If the control logic of the cache controller determines the requested data has been received as fill data based on the corresponding miss ("yes" branch of the conditional block 408), then the control logic updates the merged memory access response with the fill data (block 412). The control logic marks the merged memory access response as a candidate for issue (block 414). The control logic has completed merging responses of multiple memory access requests into the merged memory access response.

As described earlier, in some embodiments, the cache controller sends a single merged memory access response to the communication fabric, whereas, in other embodiments, the cache controller sends a merged memory access response for any cluster with a compute unit that sent a memory access request with a response merged in the merged memory access response. Later, after the merged memory access response(s) are scheduled for issue, and issued, control logic within the communication fabric generates multiple memory access responses from a single merged memory access response to send to corresponding compute units. Transmitting the merged response through one or more levels of routing logic and intermediate queues of the communication fabric before broadcasting (or multicasting) multiple memory access responses from the merged response reduces the bandwidth utilization of the communication fabric.

Figure 5:
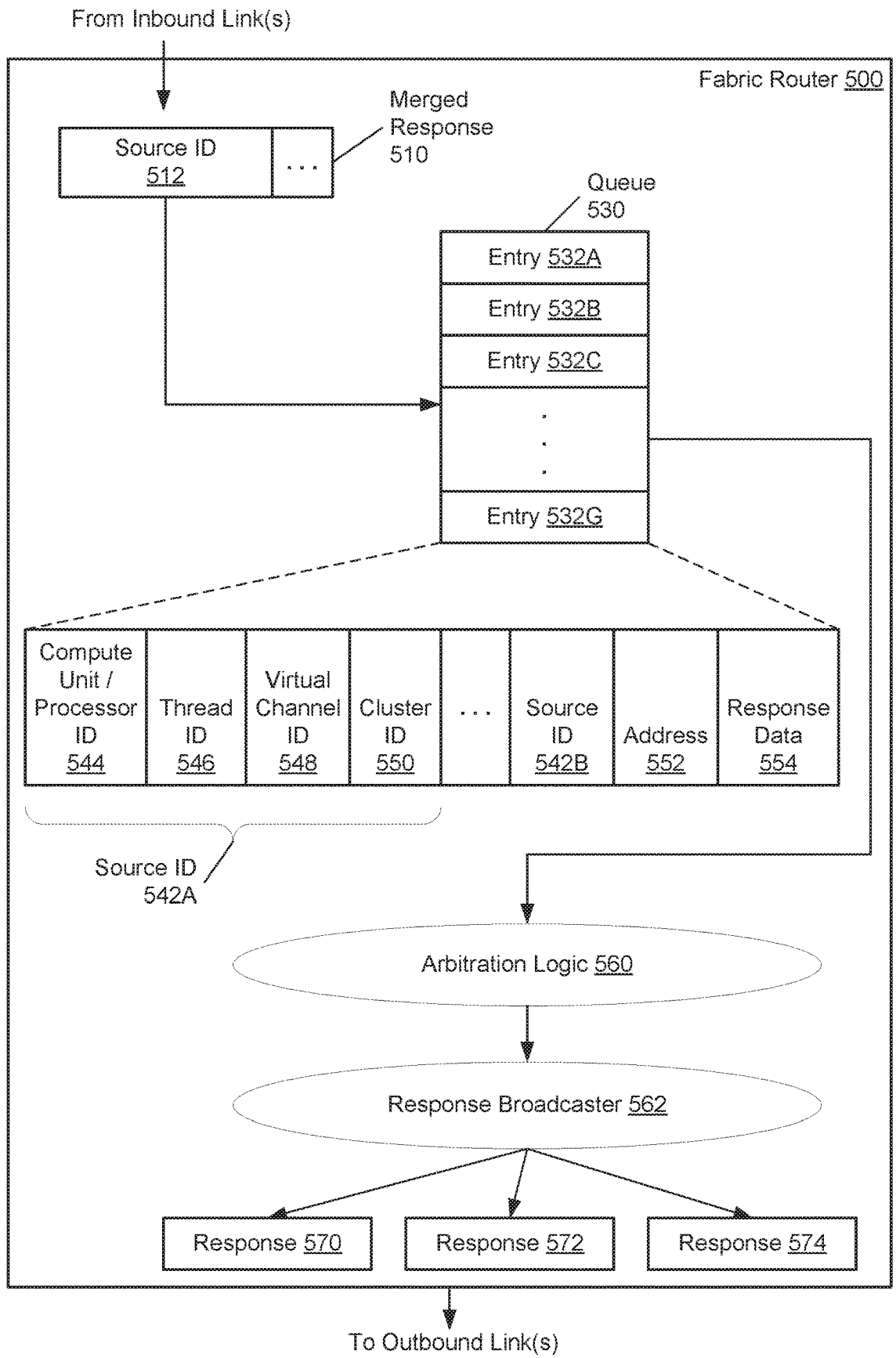
FIG. 5 is a generalized diagram of one embodiment of a fabric router.

Referring to FIG. 5, a generalized block diagram of one embodiment of a fabric router 500 is shown. The fabric router 500 is a generic representation of multiple routers or switches used in a communication fabric for routing packets, responses, commands, messages, payload data, and so forth. Interface logic, clock signals, configuration registers, and so forth are not shown for ease of illustration. As shown, the fabric router 500 includes the queue 530, arbitration logic 560 and response broadcaster 562. Although the fabric router 500 is shown to receive responses, such as merged response 510, on an inbound link and convey multiple responses on an outbound link, which suggests data flow from lower level caches to higher level caches and compute units, in some embodiments, the fabric router includes components for data flow in the other direction. In another embodiment, fabric router 500 handles data flow in a single direction while another router or switch handles data flow in the other direction of the communication fabric.

Although the fabric router 500 includes a single queue 530, in other embodiments, the fabric router 500 uses another number of queues. The fabric router 500 receives merged response 510 from an inbound link. However, it is also possible that fabric router 500 receives non-merged responses on inbound links. The merged response 510 includes at least a source identifier (ID) 542A. In some embodiments, the source ID 542A includes the information in the fields 544-550, which are equivalent to the information described earlier for the fields 274-280. In other embodiments, the source ID 542A additionally includes one or more of a process ID and an application ID. Other information (not shown) in the merged response 510 includes a request type for indicating the merged response 510 is response for a read operation or a write operation. The merged response 510 includes multiple source identifiers such as at least source ID 542A and source ID 542B. The merged response 510 also includes a target address 552 and response data 554. Although the merged response 510 is shown as a single response, in other embodiments, the merged response 510 is divided into a response command and response payload data corresponding to the response command.

Control logic, which is not shown for ease of illustration, determines which entry of entries 532A-532G to allocate for the received merged response 510. The control logic, the arbitration logic 560 and the response broadcaster 562 are implemented in hardware such as circuitry. The queue 530 includes multiple entries 532A-532G for storing information. In various embodiments, each of the entries 532A-532G stores at least fields 544-554. Other fields included in entries 532A-532G, but not shown, include a status field indicating whether an entry stores information of an allocated entry. Such an indication includes a valid bit. Another field stores an indication of the request type.

In some embodiments, control logic allocates entries 532A-532G in the queue 530 in an in-order manner, so the entry positions of entries 532A-532G indicate age. If control logic allocates entries 532A-532G in the queue 530 in an out-of-order manner, then the entries 532A-532G store an additional age field. In various embodiments, the arbitration logic 560 deallocates the entries 532A-532G in the queue 530 in an out-of-order manner. For example, the arbitration logic 560 selects one of entries 532A-532G based on one or more attributes. Examples of the one or more attributes are a priority level of the response, a quality-of-service (QoS) parameter, a source identifier, an application identifier or type, such as a real-time application, an indication of data type, such as real-time data, a bandwidth requirement or a latency tolerance requirement, a virtual channel identifier, and so forth. The arbitration logic 560 avoids system level deadlocks.

In an embodiment, the arbitration logic 560 uses a weighted sum of the attributes for selecting responses stored in the queue 530 for issue. The arbitration logic 560 also determines a weighted sum for a merged response based on an average of weighed sums or a maximum of the weighted sums for the multiple responses merged in the merged response. When the arbitration logic 560 selects an entry of entries 532A-532G, the response broadcaster 562 determines whether the selected response is a merged response. If not, then the response broadcaster 562 prepares a transmission packet for the single response. If so, then the response broadcaster 562 prepares multiple transmission packets for the merged response.

The response broadcaster 562 uses the information in the source IDs 542A-542B to generate the multiple transmission packets. Although three responses 570-574 are shown as transmission packets to send on outbound links, another number of responses is possible and contemplated. Although the response broadcaster 562 is shown as being placed after the arbitration logic 560, in other embodiments, the response broadcaster 562 is placed before the queue 530. In such an embodiment, the response broadcaster 562 generates multiple responses for a merged response, such as merged response 510, and queue 530 stores the resulting multiple responses.

Figure 6:
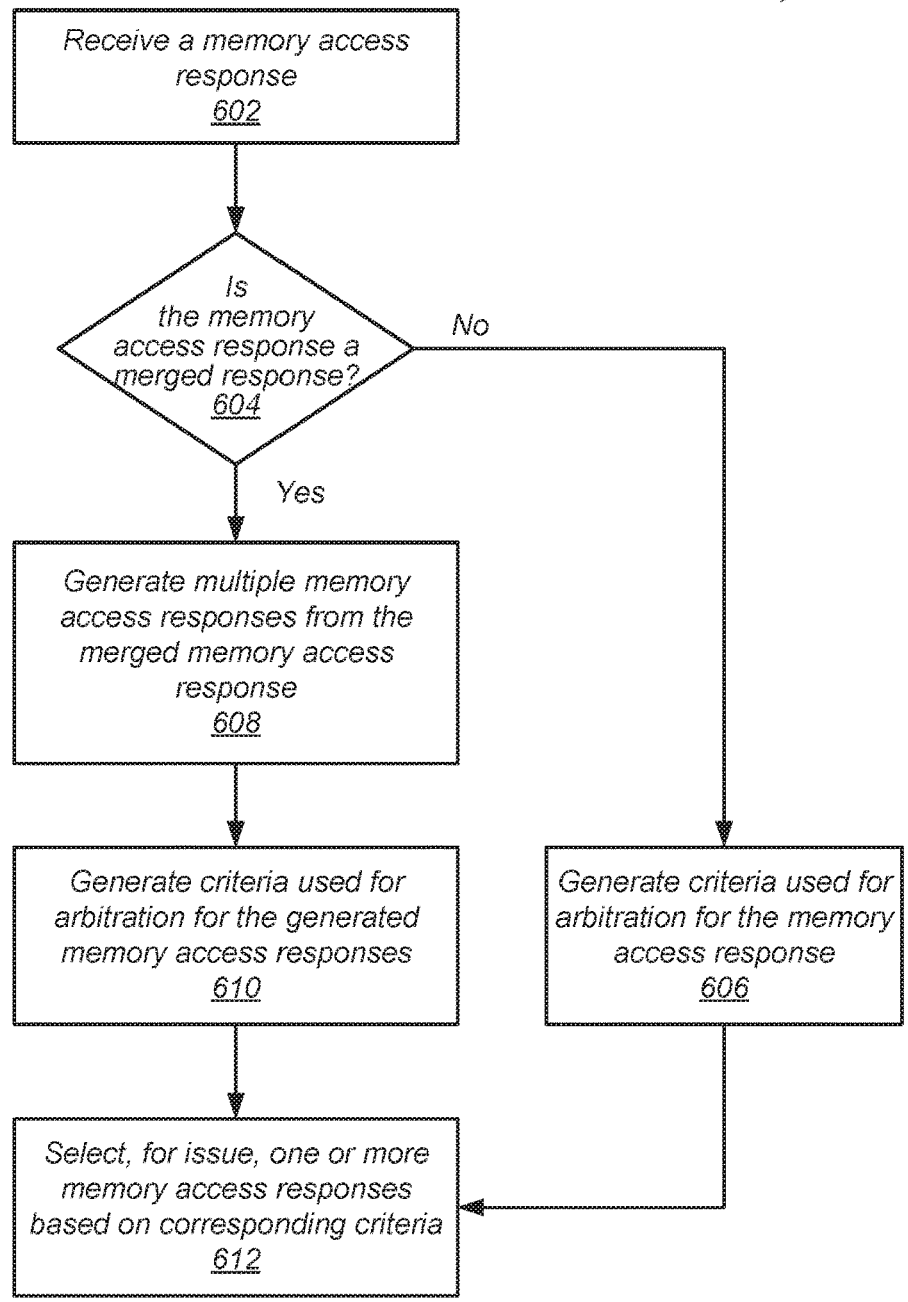
FIG. 6 is a generalized diagram of another embodiment of a method for efficiently processing memory requests.

Turning now to FIG. 6, one embodiment of a method 600 for efficiently processing memory requests is shown. One or more processors of multiple compute units execute threads of one or more applications. In some embodiments, some threads are associated with general-purpose algorithms, other threads are associated with parallel data computational intensive algorithms, and yet other threads are associated with general-purpose (GP) GPU algorithms. The compute units generate memory requests and send them to one or more local higher level caches. When cache misses occur, the higher level caches send miss requests to lower level caches via a communication fabric. The lower level caches service the miss requests and send the corresponding memory responses to the higher level caches via the communication fabric. A queue of a fabric router in a communication fabric receives a memory access response (block 602).

If control logic of the fabric router determines the memory access response is not a merged response ("no" branch of the conditional block 604), then the control logic generates criteria used for arbitration for the memory access response (block 606). As described earlier, examples of the criteria are a priority level of the response, a quality-of-service (QoS) parameter, a source identifier, an application identifier or type, such as a real-time application, an indication of data type, such as real-time data, a bandwidth requirement or a latency tolerance requirement, a virtual channel identifier, and so forth. In various embodiments, the control logic generates a weighed sum of the attributes to use for issue selection.

If control logic of the fabric router determines the memory access response is a merged response ("yes" branch of the conditional block 604), then the control logic generates multiple memory access responses from the merged memory access response (block 608). The control logic generates criteria used for arbitration for the multiple memory access responses (block 610). The control logic selects, for issue, one or more memory access responses based on corresponding criteria (block 612). As described earlier, in other embodiments, the control logic generates the multiple responses from a merged response after selecting, for issue, the merged response. Transmitting the merged response through one or more levels of routing logic and intermediate queues of the communication fabric before broadcasting (or multicasting) multiple memory access responses from the merged response reduces the bandwidth utilization of the communication fabric.

It is noted that one or more of the above-described embodiments include software. In such embodiments, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various embodiments, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
a queue configured to store a plurality of memory access responses; and
control logic configured to:
merge information, into a first memory access response, corresponding to one or more memory access requests based at least in part on a determination that:
the one or more memory access requests target a same cache line as the first memory access request; and
a period of time elapsed since the first memory access response was marked as not being a candidate for issue from the queue is less than a threshold.

2. The apparatus as recited in claim 1, wherein, based at least in part on a determination that the period of time exceeds the threshold, the control logic is further configured to:
complete merging information in the first memory access response; and
mark the first memory access response as a candidate for issue from the queue.

3. The apparatus as recited in claim 1, wherein the control logic is further configured to determine that the first memory access request hit in the cache.

4. The apparatus as recited in claim 1, wherein the information identifies a plurality of compute units that generated the one or more memory access requests.

5. The apparatus as recited in claim 4, wherein the control logic is further configured to:
store the first memory access response in an intermediate queue of a communication fabric; and
generate a plurality of memory access responses from the first memory access response to send to the plurality of compute units.

6. The apparatus as recited in claim 1, wherein:
the information of the first memory access response identifies a first cluster of a plurality of clusters, each of the plurality of clusters comprising one or more compute units; and
the first cluster comprises at least one compute unit that generated one of the one or more memory access requests.

7. The apparatus as recited in claim 6, wherein the control logic is further configured to:
generate a second memory access response based at least in part on a determination that a second cluster of the plurality of clusters comprises at least one compute unit that generated one of the one or more memory access requests; and
merge information, in the second memory access response, identifying the second cluster.

8. The apparatus as recited in claim 7, wherein the control logic is further configured to:
store the first memory access response in a first intermediate queue of a communication fabric;
store the second memory access response in a second intermediate queue of the communication fabric; and
generate a plurality of memory access responses from one or more of the first memory access response and the second memory access response to send to the plurality of compute units.

9. A method comprising:
storing, in a queue by control logic, a plurality of memory access responses;
merging information, into a first memory access response by the control logic, corresponding to one or more memory access requests, in response to determining:
the one or more memory access requests target a same cache line as the first memory access request; and
a period of time elapsed since the first memory access response was marked as not being a candidate for issue from the queue is less than a threshold.

10. The method as recited in claim 9, further comprising marking the first memory access response as a candidate for issue from the queue, in response to determining the period of time exceeds the threshold.

11. The method as recited in claim 9, further comprising updating the threshold based on a utilization of one or more of a plurality of compute units configured to generate memory access requests.

12. The method as recited in claim 9, wherein the information identifies a plurality of compute units that generated the one or more memory access requests.

13. The method as recited in claim 12, further comprising:
storing the first memory access response in an intermediate queue of a communication fabric; and
generating a plurality of memory access responses from the first memory access response to send to the plurality of compute units.

14. The method as recited in claim 9, wherein:
the information of the first memory access response identifies a first cluster of a plurality of clusters, each of the plurality of clusters comprising one or more compute units; and
the first cluster comprises at least one compute unit that generated one of the one or more memory access requests.

15. The method as recited in claim 14, further comprising:
generating a second memory access response, in response to determining a second cluster of the plurality of clusters comprises at least one compute unit that generated one of the one or more memory access requests; and
merging information, in the second memory access response, identifying the second cluster.

16. The method as recited in claim 15, further comprising:
storing the first memory access response in a first intermediate queue of a communication fabric;
storing the second memory access response in a second intermediate queue of the communication fabric; and
generating a plurality of memory access responses from one or more of the first memory access response and the second memory access response to send to the plurality of compute units.

17. A computing system comprising:
a plurality of compute units configured to generate memory access requests;
a communication fabric;
a cache controller coupled to the plurality of compute units via the communication fabric;
wherein the cache controller is configured to:
store, in a queue, a plurality of memory access responses;
merge information, into a first memory access response, corresponding to one or more memory access requests based at least in part on a determination that:
the one or more memory access requests target a same cache line as the first memory access request; and
a period of time elapsed since the first memory access response was marked as not being a candidate for issue from the queue is less than a threshold.

18. The computing system as recited in claim 17, wherein the cache controller is further configured to mark the first memory access response as a candidate for issue from the queue based at least in part on a determination that the period of time exceeds the threshold.

19. The computing system as recited in claim 17, wherein:
the information of the first memory access response identifies a first cluster of a plurality of clusters, each of the plurality of clusters comprising one or more compute units of the plurality of compute units; and
the first cluster comprises at least one compute unit that generated one of the one or more memory access requests.

20. The system management unit as recited in claim 19, wherein the cache controller is further configured to:
generate a second memory access response based at least in part on a determination that a second cluster of the plurality of clusters comprises at least one compute unit that generated one of the one or more memory access requests; and
merge information, in the second memory access response, identifying the second cluster.

* * * * *